(12) United States Patent
Fenyvesi et al.

(10) Patent No.: US 11,087,638 B2
(45) Date of Patent: Aug. 10, 2021

(54) SYSTEM AND METHOD FOR ANALYSING SPORTS PERFORMANCE DATA

(71) Applicant: Telefonaktiebolaget LM Ericsson (publ), Stockholm (SE)

(72) Inventors: Nóra Fenyvesi, Budapest (HU); István Gódor, Budapest (HU); Zsófia Kallus, Budapest (HU); József Stéger, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 54 days.

(21) Appl. No.: 16/474,151

(22) PCT Filed: Jan. 26, 2017

(86) PCT No.: PCT/EP2017/051665
§ 371 (c)(1),
(2) Date: Jun. 27, 2019

(87) PCT Pub. No.: WO2018/137768
PCT Pub. Date: Aug. 2, 2018

(65) Prior Publication Data
US 2019/0318651 A1    Oct. 17, 2019

(51) Int. Cl.
*G09B 19/00* (2006.01)
*G07C 1/28* (2006.01)

(52) U.S. Cl.
CPC ........... *G09B 19/0038* (2013.01); *G07C 1/28* (2013.01)

(58) Field of Classification Search
USPC ........................................................ 700/91
See application file for complete search history.

(56) References Cited

U.S. PATENT DOCUMENTS

| | | |
|---|---|---|
| 2006/0010101 A1 | 1/2006 | Suzuki et al. |
| 2006/0294231 A1 | 12/2006 | Blencowe |
| 2011/0214020 A1 | 9/2011 | Caspi et al. |

(Continued)

FOREIGN PATENT DOCUMENTS

EP    1577783 A1    9/2005

OTHER PUBLICATIONS

Eagle, N. et al., "Reality mining: sensing complex social systems", Personal and Ubiquitous Computing, vol. 10, Nov. 3, 2005, pp. 255-268, Springer-Verlag.

(Continued)

*Primary Examiner* — Pierre E Elisca
(74) *Attorney, Agent, or Firm* — Coats + Bennett, PLLC

(57) ABSTRACT

A computer system and computer-automated method for analyzing sports performance data from a game. A data set is provided that contains a log of a first time sequence of game data events which are classified into event types. A second time sequence is generated from the first time sequence by aggregating the events into game patterns, and a third time sequence is generated by aggregating the game patterns into game strategies. A multi-level time sequence event hierarchy is thus created. These multiple time sequence levels are rendered into a visualization in which the different types at each level are visually distinct from each other. The visualization reveals to a game expert player or team behavior in the data set which can be used for player and team improvement.

18 Claims, 9 Drawing Sheets

(56) References Cited

U.S. PATENT DOCUMENTS

| | | |
|---|---|---|
| 2012/0064956 A1 | 3/2012 | Das et al. |
| 2012/0198346 A1 | 8/2012 | Clemm et al. |
| 2013/0080617 A1 | 3/2013 | Driesen et al. |
| 2013/0095924 A1* | 4/2013 | Geisner ............. G09B 19/0038 463/32 |
| 2013/0262656 A1 | 10/2013 | Cao et al. |
| 2013/0317944 A1 | 11/2013 | Huang et al. |
| 2014/0344698 A1* | 11/2014 | Hohteri ............. G06F 3/04847 715/720 |
| 2014/0379895 A1 | 12/2014 | Jain |
| 2015/0029341 A1 | 1/2015 | Sinha |
| 2015/0248917 A1* | 9/2015 | Chang .................. G11B 27/28 386/282 |
| 2016/0035115 A1 | 2/2016 | Krajec |
| 2016/0071548 A1 | 3/2016 | House et al. |
| 2016/0182321 A1 | 6/2016 | Broda et al. |
| 2016/0335260 A1 | 11/2016 | Convertino et al. |
| 2019/0318651 A1 | 10/2019 | Fenyvesi et al. |
| 2019/0320329 A1 | 10/2019 | Gódor et al. |
| 2019/0347956 A1* | 11/2019 | Daga .................. G09B 19/0038 |
| 2020/0005670 A1* | 1/2020 | Iwao ........................ G09B 5/02 |

OTHER PUBLICATIONS

González, M. et al., "Understanding Individual Human Mobility Patterns", Nature International Journal of Science, vol. 453, Jun. 5, 2008, pp. 779-782, Nature Publishing Group.

Grauwin, S. et al., "Towards a Comparative Science of Cities: Using Mobile Traffic Records in New York, London, and Hong Kong", Computational Approaches for Urban Environments, Oct. 1, 2014, pp. 1-24, Springer.

Kondor, D. et al., "A Tale of Many Cities—Visualizing Signatures of Human Activity in Cities Across the Globe", Landscape Architecture Frontiers, vol. 3 No. 3, Jun. 1, 2015, pp. 54-61, Higher Education Press.

Godor, I. et al., "The Signatures of City Life", Ericsson Mobility Report, Nov. 1, 2014, pp. 28-29, Ericsson.

Godor, I. et al., "The Digital Signatures of Sport", Ericsson Mobility Report, Jun. 1, 2015, pp. 20-23, Ericsson.

* cited by examiner

SYSTEM AND METHOD FOR ANALYSING SPORTS PERFORMANCE DATA

TECHNICAL FIELD

The present disclosure relates to analysing, visualizing and acting on sports performance data.

BACKGROUND

Data analysis of sports data to improve player technique is relatively well established, such as improving a player's golf swing or tennis strokes.

However, sports data analysis for improving game strategy is less well developed.

US 2012/0064956 A1 discloses a computer application that can be used by sports teams to capture and analyze outcomes of plays in real-time in order to evaluate efficiency and performance of specific players or plays, i.e. game strategies. The analysis is said to allow teams to use historical data to predict and determine the best possible plays to execute in a given scenario.

More generally, in many areas of technology, complex analytics solutions are applied to raw data that are received from sensors, such as measurements of dynamically changing parameters. Often sophisticated algorithms are used for detection of complex events. These methods range from using expert domain knowledge hard-coded into fixed algorithms and parameter settings on the one hand, and automatic, data-driven solutions such as machine learning on the other hand. For the first part, deep understanding of the processes involved is learned from the experience of experts. For example, in the sports domain, trainers know game strategies are features that are associated with better performance of players and teams.

The results of such analyses can be included in a reporting system for automated actions, alerts and real-time feed-back for decision makers or various end-users. The goal of end-users is not only acknowledgment of events occurring in the system but also searching for new patterns that can provide new algorithmic solutions or trigger singular actions. As new domains such as sport analytics see new, more sophisticated ways of detecting events on several levels of complexity new ways of presenting results become a necessity as the end-user should be able to benefit from such analytical results without a difficult learning curve.

The new complexity levels and granularity of measurement feeds also present advantages for performance visualization where event patterns determine performance instead of single property of events.

Some solutions are known which provide visualizations of performance metrics, e.g., based on real-time feedback about changes in performance. The visualization may use dynamic waterfall charts or event chain timelines combined with performance metrics. Other known examples, work with statistical numbers summarizing specific performance aspects or interpose visualization on video recording of the physical space.

US201682321 A1 relates to active waterfall charts for continuous, real-time visualization of website performance data.

US 2016/0035115 A1 relates to event chain visualization of performance data.

US 2016/0071548 A1 discloses play sequence visualization and analysis.

SUMMARY

According to a first aspect of the disclosure there is provided a computer-automated method for analysing sports performance data from a game, the method comprising:
  receiving a data set containing a log of a first time sequence of game data events in which each event has been classified into one of a plurality of event types;
  creating a second time sequence from the first time sequence by aggregating the events into event patterns, wherein each event pattern is defined as a plurality of events which are in a specific sequence of event types, each event pattern being classified into one of a plurality of event pattern types;
  creating a third time sequence from the second time sequence by aggregating the event patterns into event strategies, wherein each event strategy is defined as a plurality of event patterns which are in a specific sequence of event pattern types, each event strategy being classified into one of a plurality of event strategy types; and
  rendering into a visualization at least one of the first time sequence, the second time sequence, the third time sequence and any optional higher order time sequences such that in the visualization each of said types is visually distinct from other types in the same time sequence.

According to a second aspect of the disclosure there is provided a computer system for performing the method of the first aspect, that is a computer system for analysing sports performance data from a game. The computer system comprises:
  a data input operable to receive a data set containing a log of a first time sequence of game data events in which each event has been classified into one of a plurality of event types;
  a memory operable to store the data set;
  a processor operable to analyse the data set through the actions of:
    (i) creating a second time sequence from the first time sequence by aggregating the events into event patterns, wherein each event pattern is defined as a plurality of events which are in a specific sequence of event types, each event pattern being classified into one of a plurality of event pattern types;
    (ii) creating a third time sequence from the second time sequence by aggregating the event patterns into event strategies, wherein each event strategy is defined as a plurality of event patterns which are in a specific sequence of event pattern types, each event strategy being classified into one of a plurality of event strategy types; and
    (iii) rendering into a visualization into a visualization at least one of the first time sequence, the second time sequence, the third time sequence and any optional higher order time sequences such that in the visualization each of said types is visually distinct from other types in the same time sequence; and
  an output operable to output the visualization to a display.

Through the multi-level hierarchical analysis, comprising three or more levels, and through the visualization, the hierarchy of events becomes intuitively visibly trackable to a game expert, who may be a coach or high-level player. The expert is able to recognize basic, mid and top level patterns of the data in the visualization. The method and computer system can take advantage of complex levels and granularity of measurement feeds, since sports performance is visualised in terms of event patterns and strategies rather than individual events.

An event is defined or characterized by a specific pattern being present in the measured or deduced timeline of the monitored game. This definition applies at each hierarchical analysis level. An event may be any event defined by the method or system for collection into the data set, in particular events known or thought to have relevance for game analysis. An event may be defined by an expert, or be defined automatically as part of the present or a previous analysis.

Events can be visualized which come from a single source stream, or from several parallel streams (e.g. one player or multiple players). The multi-level hierarchical analysis combined with the visualization allows expert's brains to recognize missing information elements and variance of delays between individual events. Specifically, a game expert is able to interpret the visualization of the second, i.e. mid, and third, i.e. top, level time sequences, even of incomplete data sets, which allows trends to be recognized as being characteristic of a given kind of player behaviour, such as a player strategy mistake or praiseworthy implementation of an advanced play. Experts can feed this information to maching learning (ML) functionalities to extend automatic detection of noteworthy patterns and strategies.

It will be understood that the events are events in a game that has been, or is being, played according to its rules. The event pattern types can be pre-defined, e.g. by the rules of the game being analysed, or defined as part of the analysis, or a combination of both. When defined as part of the analysis, the event pattern types can be defined as part of creating the second time sequence from the first time sequence and according to the first time sequence.

The event strategy types may also either be pre-defined or defined as part of the analysis, or a combination of both. When defined as part of the analysis, the event strategy types can be defined as part of creating the third time sequence from the second time sequence and according to the second time sequence. When pre-defined, each specific sequence of event pattern types defined as an event strategy represents implementation of a known gaming strategy, e.g. known to an expert coach or player of the game.

In different embodiments, wherein the game is a sport and the events are measured during playing the sport, the sport may be one of the following: a racquet sport (e.g. tennis, squash, badminton, lacrosse), a hand sport (e.g. basketball, gaelic handball, handball), a bat-and-ball sport (e.g. cricket, baseball, hockey, ice hockey, golf), a football sport (e.g. rugby football, American football, association football aka soccer, Australian rules football), and a cue sport (e.g. snooker, pool, billiards).

In many embodiments, the sport involves a ball, and the events in that case include, or consist of, ball contacts with at least one of a playing surface, a playing implement and a player. The term ball is meant to include shuttlecock (badminton) and puck (ice hockey). By playing implement, we mean, for example, racquet, cue, bat, stick, hand.

Generally, a sport will involve a single player (e.g. squash drills, golf, some forms of billiards), two players (most racquet sports when played in singles format), or two teams of players (most racquet sports when played in doubles format, volleyball, cricket, association football). For the data acquisition, each player can constitute a node, and the player position is logged as part of the data set along with the game data, e.g. game data relating to ball impacts. The player position may be continuously tracked in the logging, or logged only at the moment of each event (e.g. each ball impact), or a subset of events (e.g. ball impact on any players playing implement or only the player who's playing implement is contacted by the ball impact). A node may also be a playing implement, such as a racquet, or a part of a playing implement, such as a racquet grip or a racquet head. It will be understood that multiple nodes may be associated with any one event. A player's grip of a handle of a playing implement may also be logged and classified, e.g. tennis forehand may be classified into Eastern, Western, Continental, Australian, double-handed. Grip may be identified by sensors on the racquet, or by image recognition, for example.

In some embodiments the method further comprises co-rendering a representation of the events into the visualization. The representation may be video footage of the events recorded in parallel with logging the first time sequence of events, or video footage rendered at least in part from an automated analysis of the first and second time sequences. If co-rendering of the game itself is desired alongside the visualization of the events, it will be understood that the data collection of event data may be extended to collect ancillary information important for video reproduction such as player positions, i.e. track players, and use this data for assisting the rendering.

Accordingly, the data set containing a log of a first time sequence of game data events may not only be such that each event has been classified into one of a plurality of event types, but also such that each event has been associated with at least one location, e.g. the location of the player and/or playing implement associated with the event being logged.

It may be more effective in some cases if the rendering produces a visualization in which the first, second and third time sequences are presented with a common time base, e.g. vertically above one another in hierarchy order.

In certain embodiments, the method may further comprise recognizing a time evolution of events in the data set by matching the current event patterns and/or strategies to a first time period of at least one stored data set in which the same event patterns and/or strategies are present. Future events and/or event patterns may then be predicted based on warping the first time period of the at least one stored data set onto the current data set and using the warped second time period of the at least one stored data set as the prediction.

In the visualization, the different types in each time series should be represented in a way in which a user can easily distinguish between them. Namely, in each time series each type can be ascribed a different visual characteristic for the visualization, for example a different colour picked from a colour chart. Moreover, in some embodiments, each event is ascribed a value of a quality parameter, which may be a continuously variable scalar parameter which can adopt a value within a particular range. The quality parameter is represented in the visualization such that the range of the quality parameter values is represented by a range of values of a visualization parameter. For example, if different colours are used to distinguish different types, then colour saturation could be used as the visualization parameter. Alternatively, luminosity or brightness could be used according to the HSL (Hue-Saturation-Lightness) or HSB (Hue-Saturation-Brightness) colour representations respectively. Another alternative would be to use opacity as the visualization parameter. The visualization can be performed by a custom graphical user interface (GUI) which receives the time series which processes the time series data to present images in a timeline which have any one or more of the following attributes: real-time, animated, searchable, zoomable in and out in time and/or space, contain icons for elements that are linked to a particular location, contain alert messages.

It will be appreciated that fourth and further higher order time sequences can be created in the same way as the recited second time sequence is created from the first time sequence, and the third time sequence is created from the second. That is an nth order time sequence can be created from an (n−1)th order time sequence by aggregating and classifying, so that the analysis levels can be built up ad infinitum to any desired level. Specifically, the method or computer system may further comprise creating at least one higher order, nth, time sequence from the previous highest order, (n−1)th, time sequence by aggregating the groups of the previous highest order, referred to as sub-ordinate groups, into supra-ordinate groups, wherein each supra-ordinate group is defined as a plurality of sub-ordinate groups which are in a specific sequence of sub-ordinate group types, each supra-ordinate group being classified into one of a plurality of event supra-ordinate group types.

Moreover, other embodiments may terminate the analysis at the second order time sequence, so not include a third order time sequence. In other words, a computer-automated method can be provided receiving a data set containing a log of a first time sequence of game data events in which each event has been classified into one of a plurality of event types; and creating a second time sequence from the first time sequence by aggregating the events into event patterns, wherein each event pattern is defined as a plurality of events which are in a specific sequence of event types, each event pattern being classified into one of a plurality of event pattern types; and rendering into a visualization at least one of the time sequences such that in the visualization each of said types is visually distinct from other types in the same time sequence. A corresponding computer system for performing this method may also be provided.

According to a further aspect of the disclosure there is provided a computer program stored on a computer readable medium and loadable into the internal memory of a computer, comprising software code portions, when said program is run on a computer, for performing the above-described methods. A computer program product may also be provided for storing the computer program.

BRIEF DESCRIPTION OF THE DRAWINGS

The embodiments of the present disclosure presented herein are described herein below with reference to the accompanying drawings.

DETAILED DESCRIPTION

In the following description, for purposes of explanation and not limitation, specific details are set forth (such as particular method steps) in order to provide a thorough understanding of the technique presented herein. It will be apparent to one skilled in the art that the present technique may be practiced in other embodiments that depart from these specific details.

Those skilled in the art will further appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and systems, the technique presented herein may also be embodied in a computer program product as well as in a system comprising a computer processor and a memory coupled to the processor, wherein the memory is encoded with one or more programs that execute the services, functions and steps disclosed herein.

Memory may comprise any known computer-readable storage medium, which is described below. In one implementation, cache memory elements of memory provide temporary storage of at least some program code (e.g., program code) in order to reduce the number of times code needs to be retrieved from bulk storage while instructions of the program code are carried out. Moreover, memory may reside at a single physical location, comprising one or more types of data storage, or be distributed across a plurality of physical systems in various forms.

The proposed computer system is able to operate as a standalone entity taking a data set as input, i.e. the raw network measurements, and presenting its analysis as a visualization on a display that is part of the computer system and/or outputting the rendered data in a format suitable presenting the visualization on an external display. In a standalone implementation, the computer system will include one or more of the following features: a data collection interface for inputting the data; data integration functionalities for domain-specific parameters; and a graphical user interface possibly having different implementation variants for different display devices. The details of these additions are well known to a person skilled in the art.

The proposed computer system is also suitable to be integrated into an existing reporting and analytics computer system.

Figure 1:
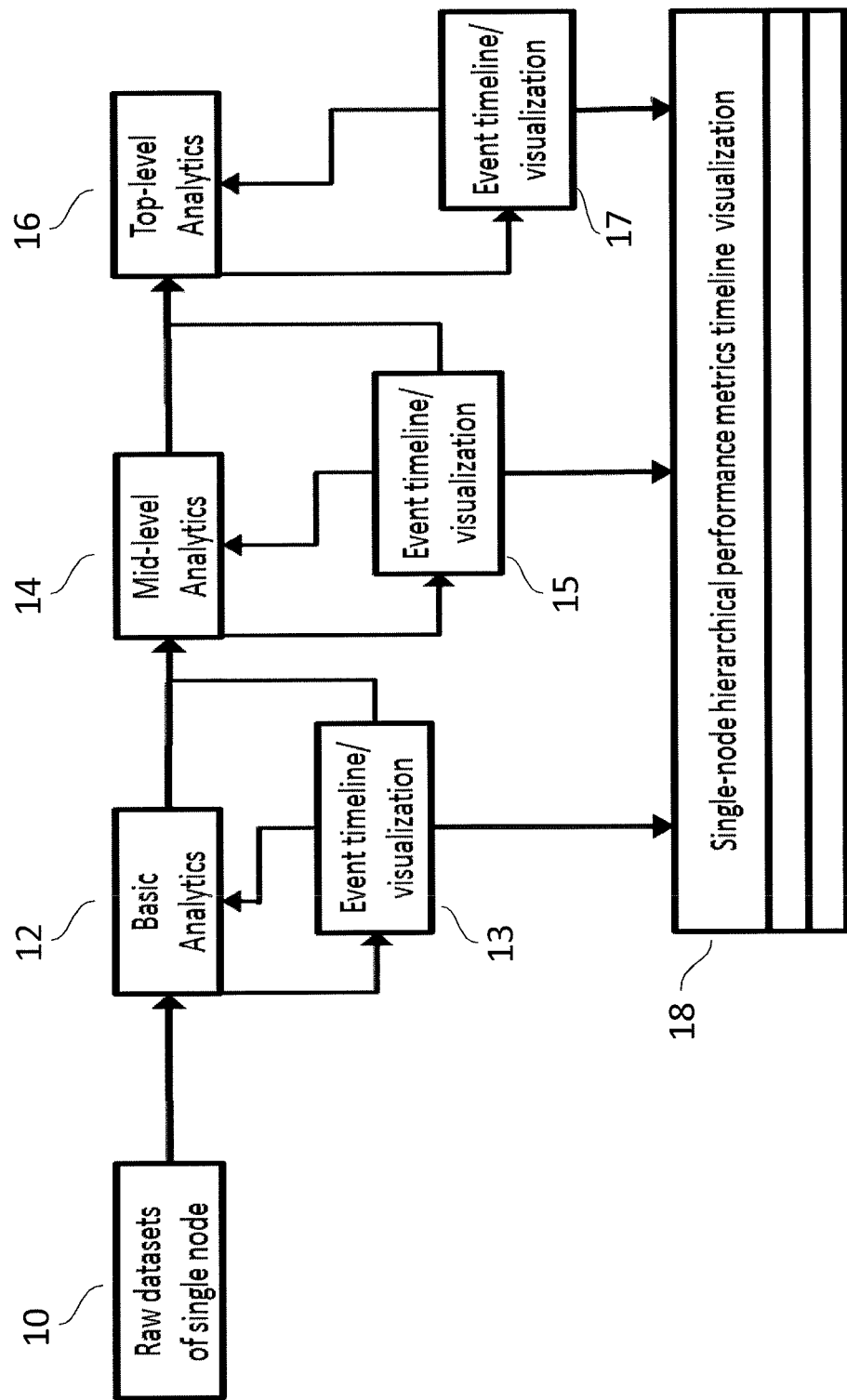
FIG. 1 shows a multi-level hierarchical analytics and visualisation method and system as envisaged by embodiments of the disclosure.

FIG. 1 shows a multi-level implementation of a hierarchical analytics and visualization method and system as envisaged by embodiments of the disclosure. In the illustrated example, there are three analytics levels, but it will be appreciated from the following that four, five, six or more analytic levels could be provided following the teachings provided.

In input module 10 receives a number of raw data sets, which collectively constitute an input data set for analysis. The input data set contains a log of a first time sequence of events. (A time sequence of events may be referred to as a timeline elsewhere in this document.)

Basic analytics are applied by a bottom-level, basic analytics module 12 to classify the events into one of a plurality of event types. The basic events timeline is rendered in a bottom-level visualization module 13 by the method into a visualization which may be displayed to a user via a graphical user interface.

Mid-level analytics are then applied by a mid-level analytics module 14 which has the role of creating a second time sequence from the first time sequence obtained from the basis analytics by aggregating the events into event patterns, referred to as patterns. Each event pattern is defined as a plurality of events which are in a specific sequence of event types. Each event pattern is classified into one of a plurality of event pattern types. The mid-level analytics may employ a pattern recognition algorithm such that the event patterns are created when predefined sequences are recognized. The mid-level events timeline is rendered by a mid-level visualization module 15 into a visualization which may be displayed to a user via a graphical user interface.

Top-level analytics are then applied by a top-level analytics module 16 which has the role of creating a third time sequence from the second time sequence by aggregating the event patterns into higher level event groups, which we refer to as gaming strategies, or strategies for short. Each event strategy is defined as a plurality of event patterns which are in a specific sequence of event pattern types. Moreover, each event strategy is classified into one of a plurality of event strategy types. The top-level analytics may employ a sequence recognition algorithm such that the event strategies are created when predefined sequences of pattern types are recognized. The top-level events timeline is rendered by a top-level visualization module 17 into a visualization which may be displayed to a user via a graphical user interface.

Each of the three timelines are co-rendered by a multi-level visualization module 18 which combines the outputs of the individual visualization modules 13, 15, 17 so that the three levels of timeline are presented alongside each other in a single visualization of all three analytics levels, so that their juxtaposition allows for direct visual comparison by a game expert user. In addition, to facilitate the visual interpretation at each analytics level, the rendering of the basic, mid and top level events is done in such a way that within each visualization level the different types are visually distinct from each other. The visualizations may create the timelines with events being colour-coded (i.e. hue) by look up to a customizable colour chart, and a quality measure being coded within each colour by another colour parameter (saturation or brightness in HSB, or saturation or luminosity in HSL). Alternatively, the quality measure value could be coded by opacity. The visualization may allow user customization, for example: a real-time sliding window view in which the user can set the time window to be visualised; zooming in or out in time after the session has finished; and enabling predefined time-warping techniques in which event types deemed to have higher importance are highlighted by extra horizontal (i.e. time axis) extension.

Any of the basic, mid and top level analytics may use automatic classification to classify the events, event patterns and event strategies respectively, wherein the automatic classification may use pattern recognition as described in any of the following publications, the entire contents of which are incorporated herein by reference:

S. Grauwin, S. Sobolevsky, S. Moritz, I. Gódor, C. Ratti—Towards a comparative science of cities: using mobile traffic records in New York, London and Hong Kong, Computational Approaches for Urban Environments, Springer, pages 363-387 (2015)

D. Kondor, P. Thebault, S. Grauwin, I. Gódor, S. Moritz, S. Sobolevsky, C. Ratti—A Tale of Many Cities—Visualizing Signatures of Human Activity in Cities Across the Globe, Landscape Architecture Frontiers, vol 3/3, pages 54-61, June 2015

I. Gódor, Z. Kallus, D. Kondor, S. Grauwin, S. Sobolevsky—The Signatures of City Life, Ericsson Mobility Report, pages 28-29, November 2014

I. Gódor, P. Jonsson, Z. Kallus, D. Kondor—The Digital Signatures of Sport, Ericsson Mobility Report, pages 20-23, June 2015

Such a quality measure may be a scalar quantity which is continuously variable to reflect, e.g. force with which the ball is hit by the racquet for a given event type, or closeness of the ball impact on a desired target impact area on a playing surface, or closeness of flight of the ball to a desired trajectory for that event pattern or strategy. The value of the quality measure will differ from case to case as presented in, for example, the previously-mentioned publication: I. Gódor, P. Jonsson, Z. Kallus, D. Kondor—The Digital Signatures of Sport, Ericsson Mobility Report, pages 20-23, June 2015, the entire contents of which is incorporated herein by reference.

The analysis is thus performed in a hierarchical manner to give three levels of performance evaluation, by feeding the output time series as input for mid-level pattern detection and feeding the mid-level output as input for top-level pattern detection. The three resulting timelines are displayed together in a hierarchical diagram, e.g. a cake diagram. The pattern detection algorithm applied at the mid and top levels can be trained by experts and/or by applying machine learning to historic datasets.

We now further discuss the three levels of the hierarchical event analytics and visualization.

The first event analytics level is constituted by the events that have been logged while monitoring a sport being played in actual events, i.e. raw game data, or pre-processed game data, e.g. the events may be peaks in particular actual events. We refer to these as basic events which form a basic timeline being formed by events identified in the raw measurement stream or streams that have been collected for analysis. For example, the basic events may be a specific type of event as seen during the playing of a game, such as a ball impact, wherein the ball impact may be with a playing surface (wall, floor, roof) and/or a playing implement or player's body.

The second event analytics level is constituted by specific basic event patterns which are each formed by specific combinations of types of basic events (from the first level). Each specific combination, i.e. pattern, of basic event types may be termed a mid-level event type. For example, a specific sequence of ball impacts may represent a particular stroke being played optionally in combination with the player being in a specific position within the playing area, e.g. court. That is a pattern is a stroke.

The third event analytics level is constituted by specific mid-level event type patterns, i.e. specific combinations of mid-level event types, which may be termed top-level event types or strategies. For example, a specific combination of strokes (i.e. mid-level event types) may represent a particular game strategy, such as a known kind of defensive strategy, attacking strategy, or point initiation strategy, e.g. serve followed by return of the opposing player's return. Strategies that are not known may also be highlighted and captured as worthy of study.

The raw measurements may come from a single stream or multiple streams which are combined into the first hierarchical event analytics level. Since the analytics levels and the multi-stream sports data are functionally orthogonal to each other, we refer to the levels of the hierarchical event analytics as vertical levels and the tiers of combination of the sports data (if present) as horizontal levels.

We introduce the combination of timelines in three horizontal levels as follows:

A simple mapping is creating event hierarchy using only a single node timeline.

A unified mapping is creating event hierarchy using the merged timelines of two or more nodes. This union is achieved by using the time ordering or matching of patterns and can be created on the basic or mid-level timelines.

A differential mapping is creating an event hierarchy where relative performance of two nodes or groups of nodes—e.g., player average vs peer group (team) average—for comparative study. Matching of patterns before differentiation can be useful to look for event-related performance, and simple time ordering to look for session-level performance comparison.

In summary, FIG. 1 shows the single-node timeline functions corresponding to the hierarchical event analytics and visualization method on three vertical levels. Basic analytics in module 12 is performed on the raw data received from module 10. The output from the basic analytics module 12 is provided to the basic level visualization module 13 and to the mid-level analytics module 14. Similarly, the output from the mid-level analytics module 14 is provided as input for mid-level visualization module 15 and the top-level analytics module 16. The three levels together serve to form the 3-level hierarchical visualization of a given node's (or group of nodes) performance timeline. Each created event timeline can serve as the basis of new pattern definition. New definitions can, in return, improve the respective analytics logic.

Figure 2:
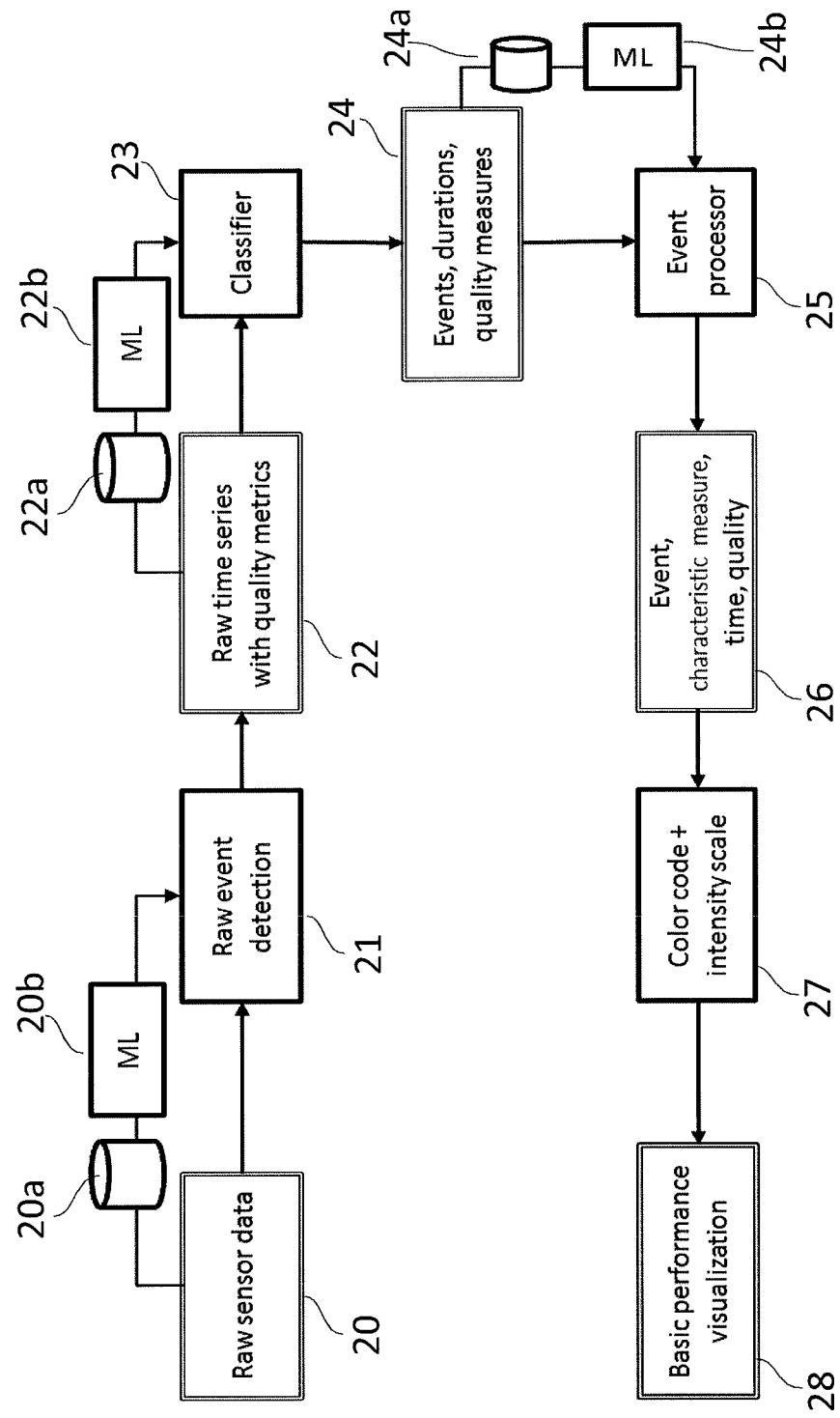
FIG. 2 shows aspects of the method and system of FIG. 1 in more detail.

FIG. 2 shows the workflow of the basic analytics module of FIG. 1 in more detail. Each box labeled "ML" is a machine learning (ML) algorithm module which applied its ML algorithm, based on pattern recognition, to the input data received as input to that analysis level. Each of the storage icons shows a reference database which at each hierarchical level has the role of hosting a reference database referenced by the ML algorithm during processing the data, and also of providing storage for the input data to that level and the output from the ML algorithm.

Time-stamped raw sensor data 20 from the sports data acquisition system is received at a first analysis level and stored in a reference database 20a. With reference to the reference database 20a a ML module 20b processes the raw sensor data by using pattern recognition to detect raw events in the raw sensor data and produce a time series of raw events. Examples of raw events in a game context might be ball contacts with playing surface or playing implement. The processed data is output to a raw event detection module 21.

Each raw event in the raw events time series is then transmitted to a quality metric addition module 22 and stored in a reference database 22a. With reference to the reference database 22a, a ML module 22b processes the raw event detection data to deduce one or more quality metrics from each event, or at least those events deemed to be significant for the particular analysis being performed (so-called use case). A quality metric is a discretely or continuously variable quantity that is a measure of goodness for performance. The quality metrics are then associated with the relevant raw event from which they have been derived. An example of a quality metric for a game is wavelength.

The processed data comprising the raw events with their quality metrics are then supplied to an event classifier module 23 which applies pattern recognition to classify each event into one of a plurality of event types based on a performance quality measure. The classifier module 23 can be pre-configured with pre-defined event types or generate event types on the fly based on analyzing the raw event data and optionally also their associated quality metrics.

The event classifier outputs the time series, now appended with event classifications, to a duration measurement module 24 and stored in a reference database 24a. With reference to the reference database 24a, a ML module 24b processes the time series and event classifications so as to associate each event with a time span, i.e. duration. The processed data is output to an event processor module 25.

The event processor module 25 has the role of processing the time series data and associated data output from the multi-level analysis performed by the preceding stages in order to produce a characteristic measure (i.e. score) and performance quality indicators from the data. Namely, the event processor module 25 processes the multi-level analysis data from the preceding stages to add a performance quality measure to each event that is to be kept as a relevant event for the particular performance use case of interest. This performance quality is the final assessment of the characteristic measure (or score), i.e. it is characteristic of an event which has meaning in the context of the use case and also a time dependency.

In a visualization preset applicator 27 the events are colour-coded, or otherwise visually tagged, according to event type. The events are additionally visually tagged according to the value of a quality measure by saturation or luminosity/brightness of the event-type colour, or some other suitable visual tagging which is distinct from, and preferably complementary to, the event type visual tagging. Another alternative would be to use opacity as the visualization parameter.

This completes the pre-processing of the basic sports data which can then be rendered into a visualization in a basic data time series visualization module 28 whose role it is to render the results of the event processing in a performance visualization, for example in real-time. The events with various scores at given times and associated time-dependent performance quality measures are parameters that the visualization module 28 can use for generating the visualization though suitable coloring, icon choice and so forth to generate the final GUI.

To interpret the visualization, the users, that is the person or persons tasked with evaluation and decision making based on their interpretation of the visualization, e.g. in a live system monitoring live gameplay, need to know the performance quality measure(s) that are being rendered, but do not need any knowledge of how the analysis is performed in detail in order to be able to understand the visualization, e.g. to identify the root cause of a current problem, e.g. poor team or player performance, or to make a prediction, e.g. outcome probabilities of a match being monitored, through the visualized timelines of events and their scores at the various levels.

In the above-described multi-level analysis, definition of event types may be pre-defined by an expert, or defined on-the-fly by the ML algorithm, or any combination of the two at any given analysis level. The proposed approach therefore permits a duality at each step of expert vs machine learning for definition of event types based on previously observed or expected patterns. The same point can also be made for the performance quality measures, i.e. they can be defined by experts in the field, or as part of the ML. At one extreme of this spectrum, the whole process can be pre-programmed by field experts using pre-defined event types, event quality measures and ultimately the resulting performance measure of the monitored system (calculated from events of various levels at specific times/places: put into context of the use case). At the other extreme, the implementation can heavily rely on automation where machine learning will find and define specific events and at most minimal settings of learning parameters are set by experts. In this latter case of ML-based detection, the learning can be performed on historic datasets and the learnt information can be used to fix the parameters that are used to process real-time data streams. Alternatively, the learning could be done in real-time on the real-time data streams, so that the analysis stages user real-time ML algorithms that learn and detect on the incoming data stream in parallel and continuously. The system can then improve its event detection and classification, and also define new event types, as more measured data is presented. With either approach, with any given definition of event types, the analysis has the task of identifying, i.e. detecting events, in the incoming data stream, e.g. in real-time, of the system being monitored. Further the analysis will compare the incoming data to, for example, a baseline, or predefined thresholds of quality measures, which are relevant in the system being monitored, where this analysis may take account of location and time when assigning a characteristic quality measure to each detected event. The events are then filtered based on the quality measure so that events that are deemed to be relevant, are tagged as such, since these will be the events that are taken forward by the process for visualization. Events filtered out may be retained despite their tagging as non-relevant, or may be deleted, or at least not passed on to the next processing stage. The quality measure is used as a score for placing the event on a quality scale that is to be used for performance evaluation of an expert via the visualization.

The workflow of FIG. 2 thus performs a number of tasks in series to create, from an input time series, a performance visualization timeline. These tasks can be summarised in order to be: pattern detection in time series of basic events identifying time and type of complex events in the raw data from the sports activity; performance metric calculation of found complex events including event classification; and visualization according to timing, type and performance metrics.

Figure 3:
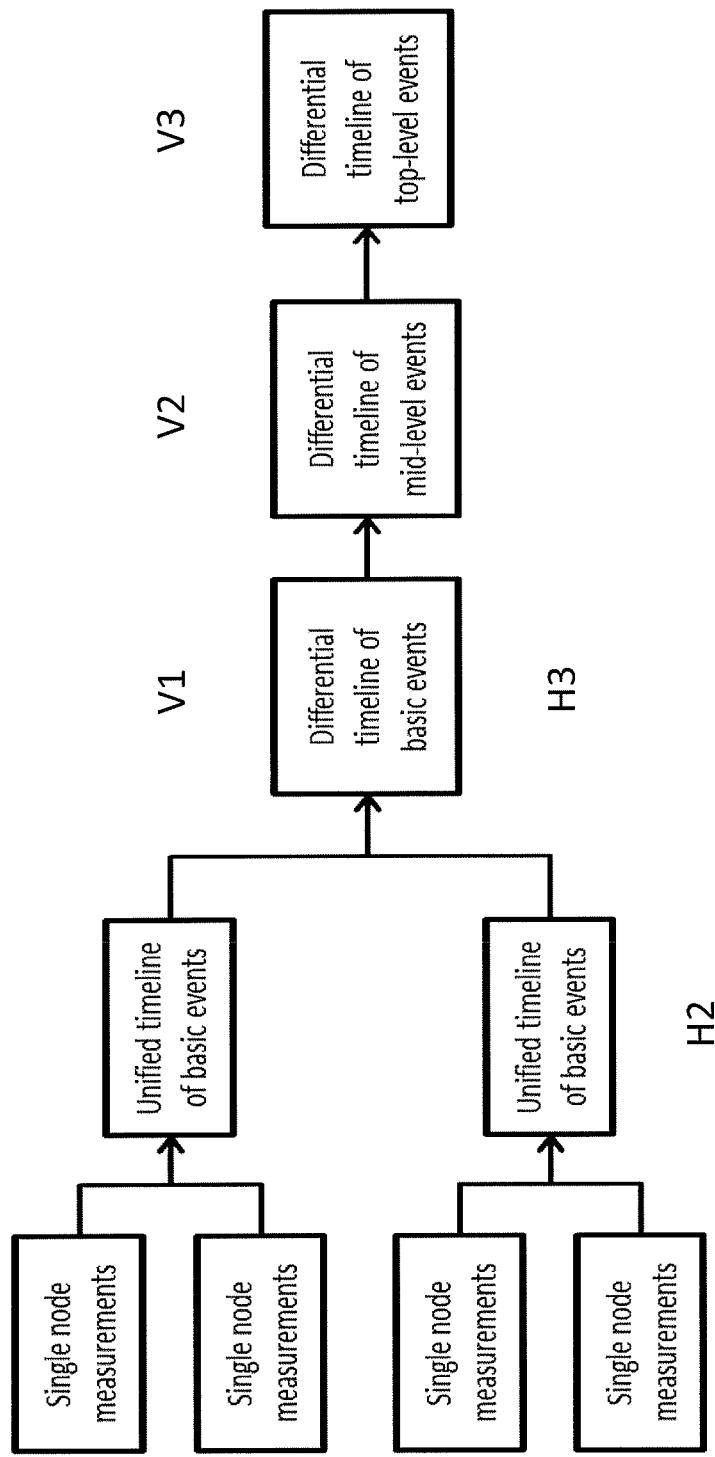
FIG. 3 shows an example of event types and data feeds with three vertical levels and three horizontal levels.

FIG. 3 shows an example of event types and data feeds with three vertical levels V1, V2, V3 and three horizontal levels H1, H2, H3 noting that the combined basic event data is both the top horizontal level H3 and the bottom vertical level V1. The horizontal level H1 could for example be single node measurements from individual players. If the sport is a team sport played by two opposing teams, then the player data may be unified into two sets of team data, so that in horizontal level H2 there is a unified timeline for each team. The unified timelines of the basic events could then be processed to generate horizontal level H3 by differentiation to find peaks in the basic event activity. This peak data is then the data input to the hierarchical analysis, i.e. data set H3 is data set V1.

On each level events are characterised by basic parameters defining event type (e.g. location on racquet of a ball impact) and event quality (e.g. force with which the ball is hit by the racquet for a given event type, or closeness of the ball impact on a desired target impact area on a playing surface, or closeness of flight of the ball to a desired trajectory for that event pattern or strategy). The events, event patterns and event strategies are visualised in different colours through look up to a colour coding chart and the quality measure by another colour parameter or opacity as described above according to a scale defined by a preset. By a preset we mean a definition which maps a range of values of the quality measure to a range of values of the parameter used to visualise the quality measure, where the mapping may be linear or non-linear. The visualization is suitable to allow game experts to make a performance evaluation, and also to recognize when new patterns occur.

A single node can be characterised based on summarised event quality over a linear timeline of a session. Differential mapping of the current timelines against stored historic timelines (or summaries thereof) can highlight trends in current performance.

A system of nodes can be analysed by using unified mappings (i.e. mid level) and/or differential mappings (i.e. top level in a three level analysis) where mid and top-level quality measures can be based on simple or relative requirements.

Definitions of new mid and top-level event patterns and strategies can be performed by the game expert without any data engineering knowledge as the visual tool facilitates intuitive understanding by inspection. In addition, new event patterns and strategies can be automatically proposed by self-learning pattern recognition algorithms to give a powerful combination of machine learning and game expert knowledge. This in return facilitates the continuous updating of rule engines using the defined events for automating actions.

Outlier recognition by game experts is similarly highly facilitated by the visual tool and its customization options. Furthermore, automated higher-level analytical tasks, such as prediction, prevention, or outlier detection can be performed using machine learning techniques on historical mid or top level timelines of nodes with similar functions.

We now describe the general principles described above with reference to a specific application to the game of squash. In this specific application, a node is a player and timelines are created for matches or training sessions. Sensors provide input data to form basic ball hit on wall and racquet events at times $t_1$, $t_2$, $t_i$ with some additional parameters such as position of player(s), force of hit, etc. Data collection is described in more detail below. This allows for the introduction of a characteristic wavelength-type quantity that is used for classification of patterns into well-known or newly found hit combinations.

Figure 4:
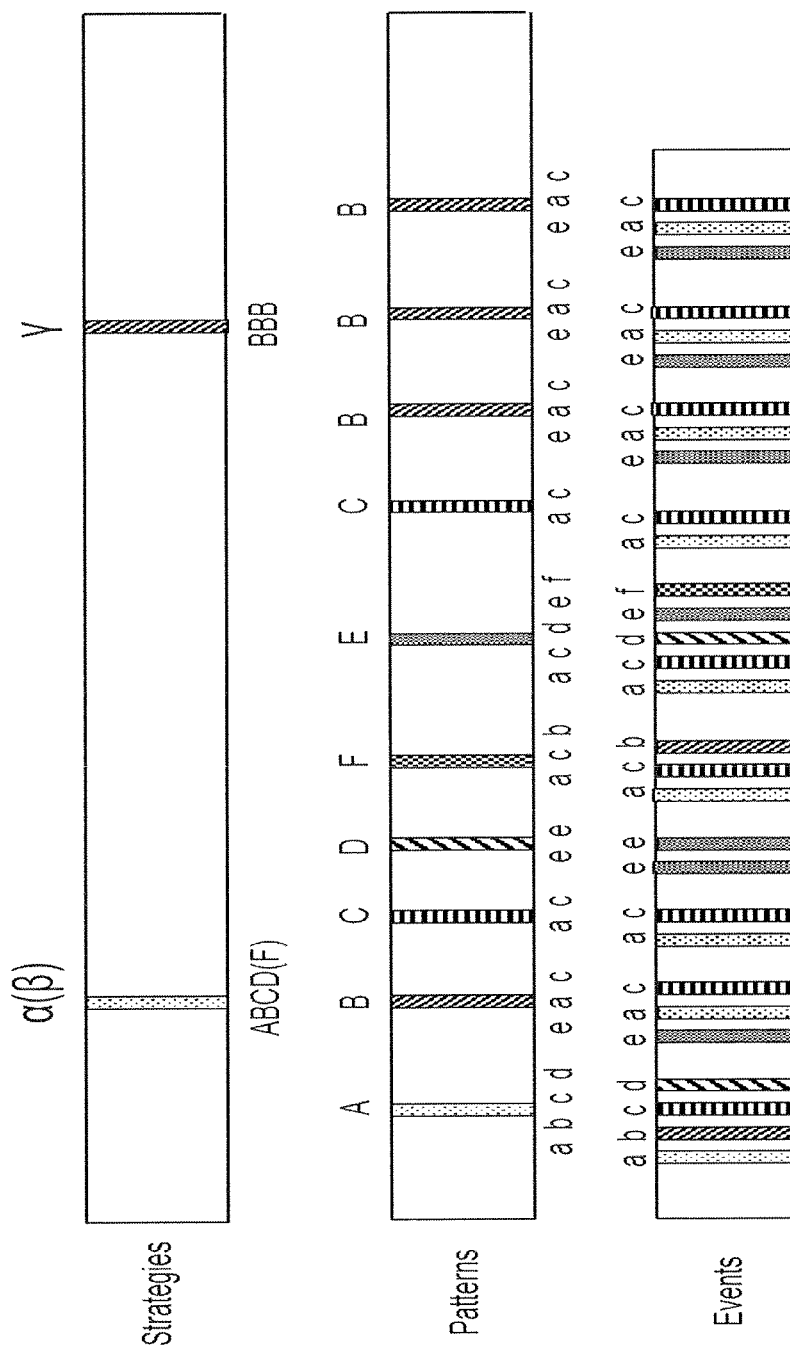
FIG. 4 shows a temporal hierarchical visualization of a multi-level network load variation analysis.

FIG. 4 shows an example performance timeline creation on three levels as follows.

The first level includes the elementary events. These are the impacts of the ball on the racquet and playing surfaces, the latter being the front wall, the sidewalls, the floor and the rear (glass) wall.

The second level is determined using the coordinates, i.e. positions, of the first level events, to identify basic shots. That is a particular shot is recognized as being a particular combination of ball impacts where additional tests may be required by the recognition based on player location at the time of one or more of the ball impacts, e.g. to distinguish between a backhand and a forehand, and to associate a given racquet ball impact with a given player. Further, at a more precise level, if the racquet head is being tracked, then location may involve identifying where on the racquet head the ball impact has taken place and optionally what angle is present between the incoming ball trajectory and the face of the racquet head at the moment of impact. Such second-level time series can be used for mapping basic player activity, e.g. with what quality level are the basic strokes being played, in order to find and correct any faults.

The third level represents the frequent combinations of shots. From visualization of this level it is possible for an expert to obtain a more detailed impression of the applied game strategies and their effectiveness during a match. These strategies can be modified during a match, in which case immediate visual feedback, i.e. during the match, can be sent to the player. This enables measurement of player performance and feedback to the player in near real-time. The system also enables fast re-analysis of historic measurements of entire matches. It is important to emphasise that this pattern visualization method allows for coaches and players to recognize complex relationships that would otherwise remain hidden using simple machine learning algorithms.

FIG. 4 illustrates the proposed method with a simple example. From elementary events, a basic squash shot was registered, the so called "three wall boast". This shot consists of five elementary ball hit events: racquet, sidewall, main wall, sidewall, floor (a, b, c, b, d). On the second level, this shot is represented by a single column. At the end of the boast shot, the ball lands on the front of the court, meaning that the opponent is going to be forced to move there too. Naturally, it is best to follow up with a shot that will force the opponent to move to the back of the court, putting him or her under pressure. These combinations of shots make up the third level (boast and then backhand volley, or forehand volley etc.).

We note that the choice of shot combinations has many alternatives and the third level could visualise deeper patterns similarly created. We also note that this illustration is an oversimplified visualization of events done here for the sake of ease of understanding of the underlying principles.

FIG. 4 shows an example of temporal hierarchical visual analysis illustrating a game play. We note that this illustration is an oversimplification in order to show the principles and has three analysis levels. In other embodiments, four or more analysis levels could be provided. With reference to FIG. 4, we now describe a specific embodiment which shows an excerpt from a squash match.

The time evolution of game play is visualised with timelines at three levels: events (ball impacts), patterns (strokes) and strategies (stroke combinations).

Level 1: For squash basic data logging would consider events to be different ball-to-racquet and ball-to-surface impacts, e.g. with the sidewalls and floor. In the particular example, the components of elementary events are:
 a—racquet
 b—right sidewall
 c—main wall
 d—left sidewall
 e—floor
 f—glass (i.e. backwall)

For example, an actual game might consist of the following events: a-b-c-d|e-a-c|a-c|e-e|a-c-b|a-c-d-e-f|a-c|e-a-c|e-a-c|e-a-c| . . .

Level 2: In many racquet sports including squash, different combinations of the elementary events form patterns, which patterns are the main targets of practices and are the building blocks of the actual strategy to be played during a game. In the particular example, the main patterns are:
 A—boast formed by a consecutive pattern of a-b-c-d
 B—backhand straight drive formed by a consecutive pattern of e-a-c
 C—backhand volley formed by a consecutive pattern of a-c
 D—end of the rally formed by a consecutive pattern of e-e
 E—forehand cross court formed by a consecutive pattern of a-c-d-e-f
 F—serve, e.g., formed by a consecutive pattern of a-c-b For example, an actual game can consist of the following patterns: A|B|C|D|F|E|C|B|B|B| . . .

Level 3: In the above example of squash, different strategies can be built from the above patterns:
 α—attack strategy formed by, e.g., a consecutive occurrence of A-B-C-D
 β—successful attack strategy formed by, e.g., a consecutive occurrence of A-B-C-D-F
 γ—defensive strategy formed by, e.g., a consecutive occurrence of B-B-B For example, an actual game can consist of the following patterns: β|γ . . .

Although this is an oversimplified description, it shows the principles involved of the multi-level hierarchical analysis and visualization of events which provides a coaching aid to players and coaches through understanding the game dynamics on two higher abstraction levels. The visualization can be performed in real time and is able to give a dynamic representation during an entire session (e.g. match or training). Once the session is finished, it is possible to output a scrollable static tape of any combination of the level visualizations so that re-analysis of historic measurements from entire sessions is possible. Based on that, a game expert can understand, for example, what the effect would be, if one of the elementary patterns were changed and how the changed pattern would possibly affect the play.

As will now be understood, characterization of performance is possible from the visualization as shown by way of example in FIG. 4.

Collection of data for input into the above-described analytics method is now described taking the example of the game of squash. It will be understood that data from other sports can be collected with a similar approach.

Everyday video recordings are watched in 25-30 frames per second (FPS) time-resolution, as it is generally considered to be sufficiently fast for smooth following of typical movements. In contrast, for tracking the trajectory of, for example, a ball with a spatial resolution equal to the size of the ball, the needed speed of recording may be calculated as follows: FPS=[speed of ball per sec]/[size of ball]. In the case of, for example, a baseball, using the above formula requires 40 [m/s]/0.073[m]≈550 FPS. An even more extreme example is a squash game, where the ball is smaller and faster at the same time. The above formula gives: 64 [m/s]/0.04 [m]=1600 FPS.

As outlined above, embodiments described herein may allow for tracking a high speed (HS) or ultra high speed (UHS) object using low-speed devices. The proposed systems and methods provide for a complex optimised solution for computer-vision-based event measurements involving HS objects, such as real-time analysis for (U)HS racquet sports.

Using external sensor data adaptive time resolution of recording may capitalise on inter- and intra-event characteristics. This may allow for precise measurements while minimizing the unnecessary load on the transmitting and processing units. The controlling method may also enable UHS recording using multiple low-speed devices working collaboratively. In some embodiments, optimization of recording, network communication and data processing in an analytics-driven control loop may be achieved by using external sensor triggers, historical databases and machine learning. As an open-ended system, it may provide event characteristics, for example, for various sport analytics platforms.

The systems and methods as described herein may provide for a three-fold optimisation for real-time object detection related to events involving small HS objects. Using sensor fusion (i.e. using various devices working together in a collaborative manner) and analytics, the described methods may capitalise on i) inhomogeneous distribution of events, focusing on active time interval and location; ii) intrinsic asymmetry of event characteristics times, with adapted precision; and iii) collaborative recording, i.e., adaptive framerates and high time-resolution measurements even with low-cost devices lacking UHS capabilities.

The optimised detection using embodiments as described herein may allow for affordable systems for high-performance tasks to be provided. In particular, excess data load is avoided by optimization; delays which may be introduced are lower; parallel and/or multi-side setups which may be used may provide for a single cheaper infrastructure.

Embodiments described herein may further take advantage of cloud analytics for machine learning. Multiple locations may hereby share collected event patterns and raw sensor data. The initial learning phase may be shortened, whereby improved configurations may be shared between sites.

Embodiments described herein may further allow for an easy adaptation by already existing active facilities. As a result, no manufacturing may be needed, such that no delayed disturbance arises for the facility.

As the system described herein is an open system, a flexible sensor setup may be provided. The system may hereby be expandable by custom analytics solutions. Furthermore, embodiments described herein may allow for a wide range of use cases which may use the output of the system: from performance metrics feedback to gamification, enhanced broadcasting or social solutions.

Embodiments described herein relate to a detection system and related methods for real-time control of digital cameras collaborating in order to accurately detect time, location and other characteristics of events involving HS, small object(s) (for example during a squash game).

Figure 5:
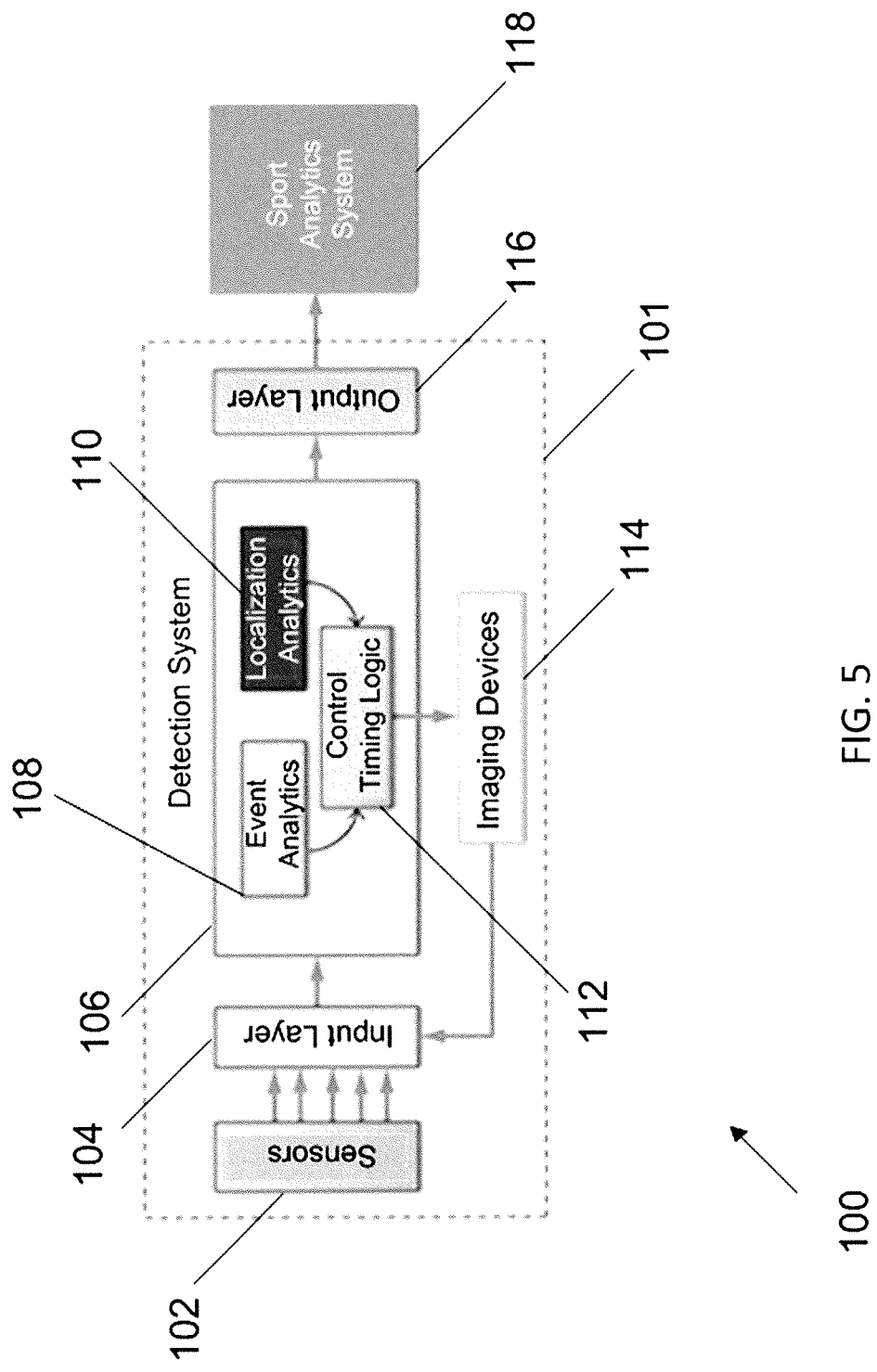
FIG. 5 shows a schematic illustration of a system according to embodiments of the present invention.

FIG. 5 shows a schematic illustration of a system 100 as described herein, and which comprises, in this example, a detection system 101 and a sport analytics system 118.

The diagram shown in FIG. 5 depicts an overall view on how the detection system may use sensor data for optimally controlling imaging devices and providing localization results and persistent recordings through an output layer. A sport analytics system may be enabled by the real-time measurements for calculating quantitative metrics and providing real-time feedback to end-users related to the specific events of interest.

In this example, the system 100 receives input information from sensors 102 through an input layer 104 combining time and location information of each measurement.

The system 100 comprises, in this example, a unit 106 which includes an event analytics module 108, a localization analytics unit 110 and a control timing logic unit 112. The event analytics module 108 is configured to determine triggers, while the localization analytics unit 110 is configured to use custom logic related to the characteristics of the event of interest. From these, the control timing logic unit 112 is configured to provide optimally timed commands for the imaging devices, e.g. cameras, 114.

Using a customizable output layer 116, all final and partial results may be shared with the external sport analytics system 118, where the location of the object and event characteristics may be used for various use cases, such as, for example, performance metrics calculations or triggering of further measurement chains.

The control timing logic unit 112 is configured to control the imaging devices 114, and an output of the imaging devices 114 is fed back to the unit 106 via the input layer 104. Controlling the imaging devices 114 by the control timing logic unit 112 is therefore responsive to the feedback from the imaging devices 114.

Figure 6:
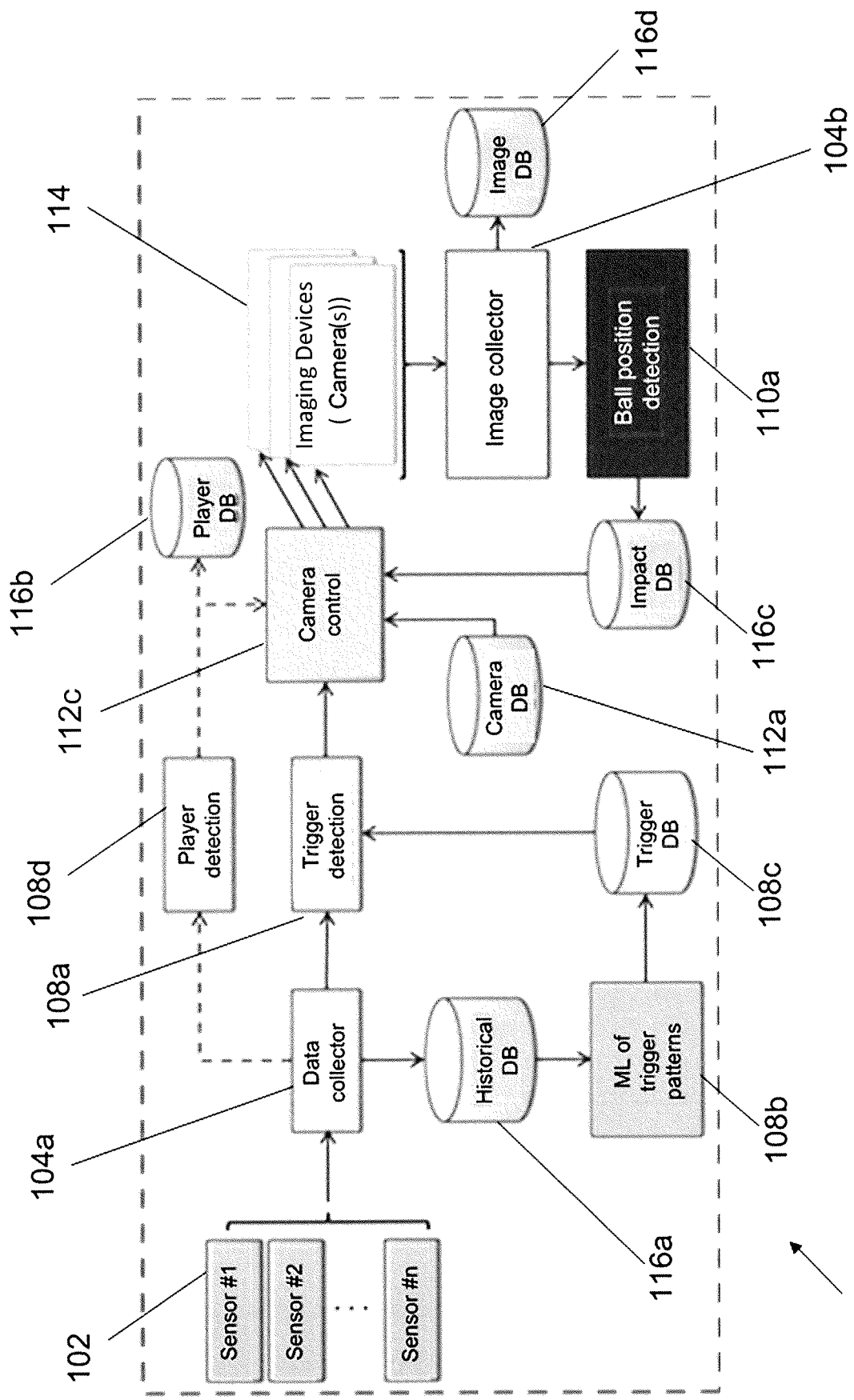
FIG. 6 shows a schematic illustration of a detection system according to embodiments of the present invention.

FIG. 6 shows a schematic illustration of the detection system 200 with colour coding following the logical units of the illustration of FIG. 5.

Generally, the input layer collects sensor and camera image data with time and location information. The various modules and devices used in embodiments of the methods and systems as described herein are depicted in boxes, while the various persistent recordings in databases form the output layer.

In this example, n sensors 102 are provided in the detection system 200. The sensors 102 are coupled to a data collector 104a, whereby the sensors 102 of the detection system 200 serve information about the trigger event that can be used later by the system to control the imaging devices 114. Such information can be, for example, the sound of the ball hit by the racquet or input from the accelerometer installed in the racquet. It will be understood that the sensors 102 may alternatively or additionally be light sensors, IR sensors, ultrasonic sensors, touch sensors, proximity sensors, pressure sensors, level sensors, or other types of sensors. It will further be appreciated that the sensors 102 may in fact be different sensors, whereby some of the sensors 102 may be a different type (or types) of sensor(s) compared to other types of sensors 102.

The input events sensed by the sensors 102 are collected by the data collector 104a component which is part of the input layer 104 of the detection system 101.

In this example, the data collector 104a stores all input data in the historical database storage unit 116a to enable further processing that may require long-term data traces and may enable fine-tuned pattern recognition, etc., or sharing of found patterns between separate sites.

In the example detection system 200 shown in FIG. 5, the historical database storage unit 116a is coupled to a machine learning module 108b which uses the historical database storage unit 116a and identifies characteristic properties and patterns of the trigger events.

Inferred knowledge obtained via the machine learning module 108b is stored, in this example, in the trigger database storage unit 108c. In this example, both databases are part of the output layer 116 shown in FIG. 4.

The trigger database storage unit 108c is coupled to the trigger detection module 108a. The trigger detection module 108a is further coupled to the data collector 104a which forwards the raw input data to the trigger detection module 108a. The trigger detection module 108a then identifies the trigger event and calculates its characteristic parameters. The previously inferred trigger patterns obtained via the machine learning module 108b are used, in this example, in the detection process as well.

The identified trigger event and all of its properties are then used by the control timing logic unit 112, which is, in this example, a camera control unit 112*c*. The camera control unit 112*c* is in charge of controlling all the imaging equipment, which includes, in this example, a plurality of cameras 114.

In this example, the camera control unit 112*c* takes into account the camera specific (configuration) information from the camera database storage unit 112*a* to which the camera control unit 112*c* is coupled.

Furthermore, in this example, a player detection unit 108*d* is coupled between the data collector 104*a* and the camera control unit 112*c*. The player detection unit 108*d* is configured to identify the movement and/or position of the player or players. The player detection unit 108*d* is coupled to the player database storage unit 116*b* in which the results of the identification of the movement and/or position of the player or players are stored.

As can be seen from FIG. 6, the camera control unit 112*c* is coupled to the trigger detection module 108*a*, such that the camera control unit 112*c* controls the plurality of cameras 114 in response to a trigger event being identified by the trigger detection module 108*a*.

The camera control unit 112*c*, when controlling the plurality of cameras 114, therefore takes into account the camera specific (configuration) information from the camera database storage unit 112*a*, the identified trigger event received from the trigger detection module 108*a* and the movement and/or position of the player or players identified by the player detection unit 108*d* that stores its results in the player database storage unit 116*b*. The result of the computation is then used to optimally control the cameras 114.

The camera control unit 112*c* is, in this example, further configured to retrieve data from the player database storage unit 116*b* which may be taken into account by the camera control unit 112*c* when controlling the cameras 114.

The images captured by the cameras 114 are, in this example, collected by the image collector 104*b* (another part of the input layer 104 as shown in FIG. 4). The captured images are stored in the image database storage unit 116*d* and further forwarded to the ball position analytics unit 110*a*.

In this example, multiple cameras are oriented to record the same location in order to create an ordered series of images using timestamps and other parameters for further analysis.

The ball position analytics unit 110*a* is configured, in this example, to calculate all the parameters of the impact of the ball on the wall (timestamp, angle, speed) as well as the trajectory of the ball. The results of the calculation of the ball position analytics unit 110*a* are then stored in the impact database storage unit 116*c*. The impact database storage unit 116*c* serves as the input for feedback to the camera control unit 112*c* in order to fine-tune its further decisions based on the previous events.

In this example, all the databases proposed in the system 200 serve as the output layer of the detection system, and these are the places where any additional analytics component can access the raw measurements or partial analytical results and query detailed information about the identified trigger, the inferred position and movement of the player or players, the board trajectory and its impact on the wall.

It will be understood that the system 200 as shown in FIG. 6 is merely an explanatory illustration of a preferred detection system. It will be appreciated that many of the components of the detection system 200 are merely optional, and the detection system in one of its basic forms may be implemented using only some of the components as shown in FIG. 5. In particular, in some embodiments, one or more sensors 102, the trigger detection module 108*a*, the camera control unit 112*c* as well as one or more cameras 114 (or one or more other imaging devices) may be used, in which a feedback from the one or more cameras 114 to the camera control unit 112*c* is provided.

Furthermore, it will be understood that the one or more cameras 114 may be configured to alternatively or additionally record videos, rather than being configured to take images only.

The systems and methods described herein may be used in support analytics scenarios. The approach may be needed in situations where speed and precision together contribute to high performance, and quantitative measures may only be calculated with capturing of relevant changes during specific events. It will be understood that the collaborative recording optimised by external events may also be used in other fields (for example industrial measurements).

Each of the following examples may be realised by a) using UHS cameras, or by b) replacing each UHS camera by a multi-camera setup. In the latter case, a series of images coming from the multi-camera unit may be arranged by the collector to perform a stream similar to what a single UHS camera may provide.

Furthermore, each of the following examples may have a) a single playing field, or b) multiple similar playing fields with their respective sensors setups. For both cases, a single central analytics system, either at the support facility or at a remote location, may use learning from the unified historic datasets.

Figure 7:
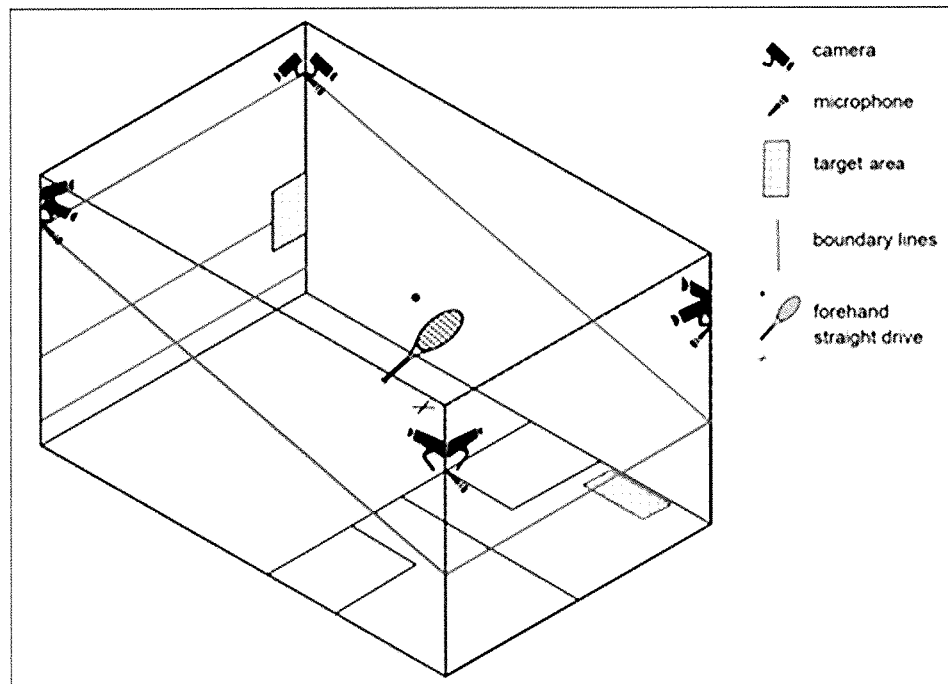
FIG. 7 shows a schematic illustration of an implementation of the system according to embodiments of the present invention.

FIG. 7 shows a schematic illustration 300 of an implementation of the system according to examples as described herein. In this scenario, real-time detection of the parameters of the ball impact event (time, location, player ID) on the main wall is provided during a squash session.

In this example, cameras record the main and side walls as well as the players. Microphones capture audio recording and are used in this example with racquet sensors for triggering event analytics. An 'X' indicates the current position of the player. The corresponding optimal target area calculated by the sport analytics system is highlighted as a rectangular area on the main wall. Hitting the optimal target area may ensure reaching an optimal, highlighted landing area on the floor (indicated in this example by a rectangular area on the right hand side of the floor).

The sport analytics system may use the detected ball impact location on the wall to calculate a performance measure of the player, which may also depend on information regarding the player position.

The detection system may serve for the support analytics system as input for real-time feedback of performance metrics for one or more players and/or trainers. In one example, the player may have to practice precisely hitting a specific area on the wall. Another example may be related game performance metrics, as illustrated in FIG. 7. The system may be used to quantify as to how well the player can target the optimal area dependent on his or her position that would send the ball to the location which may be the most difficult to reach for the other player.

UHS recording may be needed, but event distribution during a session may be sparse and uneven. Thus constant measurements may create unnecessary data load without analytical value for this use case, and the systems and methods described herein may result in significant optimization.

In this example, player detection and ball impact detection use separately controlled cameras. Furthermore, in this example, racquet and audio sensors complement the measurements. A machine learning module is used in this example which may find one or more trigger patterns in raw datasets.

As the various sensors shown in FIG. 7 may work together in a collaborative manner, this sensor fusion may result in higher precision, thereby resulting in a reduction of false trigger events being identified by the trigger detection module.

Figure 8:
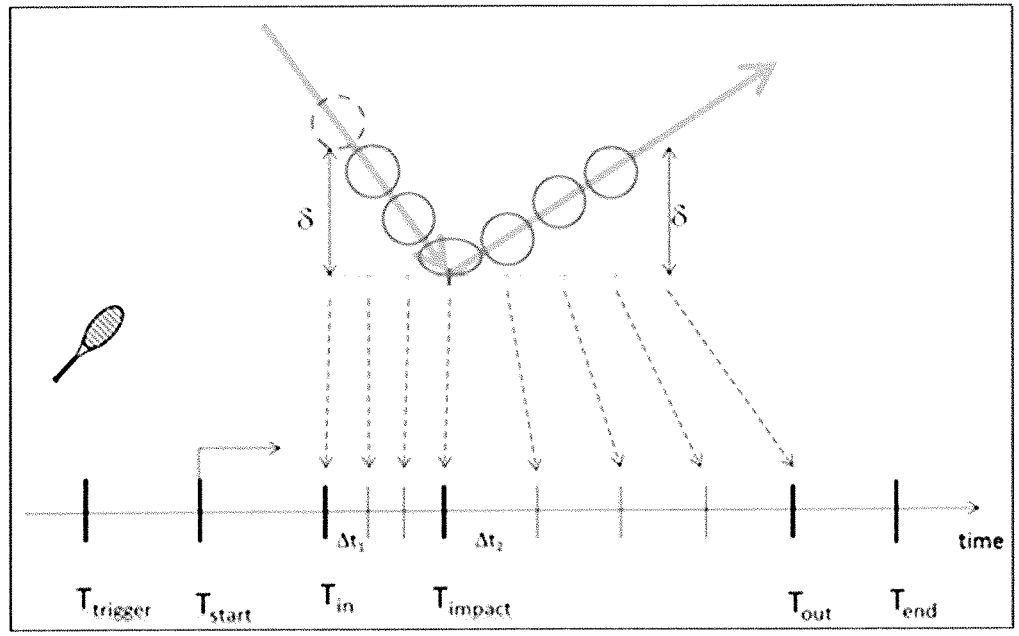
FIG. 8 shows a schematic illustration of a scenario in which the detection system according to embodiments of the present invention is used.

FIG. 8 shows a further schematic illustration 400 of a scenario in which the detection system as described herein may be used.

In this example, real-time detection of the intrinsic parameters of the ball impact events (incoming/outgoing speeds, directions, position) on the main wall is provided during a squash session.

As the restitution coefficient (which is defined by the ratio between the relative velocity after the collision and the relative velocity before the collision) of the squash ball is significantly lower than 1 by design, it will inevitably slow down after high-energy impact. The restitution coefficient of the ball may also be dependent on the temperature, etc., and may vary between balls and during the game. In order to measure event parameters, precise recording in the vicinity of the ball may be needed. Varying the speed of recording may hence be required during the event. Adapting the frame rates may optimally require both collaborative recording for UHS time resolution and flexible control.

The schematic illustration shown in FIG. 8 may depict elements of the example implementation of the methods and systems as described herein and as shown in FIG. 5.

The incoming ball hits the wall at the time $T_{impact}$. The velocity of the ball after the impact is significantly lower compared to the velocity of the ball before the impact.

The angle of reflection of the ball trajectory when measured from the wall is, in this example, smaller compared to the angle of incidence of the ball before the ball hits the wall.

$T_{trigger}$ denotes the time at which the trigger event is being identified such that the imaging devices are being controlled from the time $T_{start}$ onwards. In this example, there is a delay between a trigger event being identified at the time $T_{trigger}$ and the time $T_{start}$ from which time onwards the imaging devices are being controlled.

However, it will be understood that there may not be a delay between the times $T_{trigger}$ and $T_{start}$.

In this example, an active interval follows a trigger event of the racquet hit and $T_{start}$ and $T_{end}$ are progressively adapted to the minimum required distance ($\delta$) from the wall for precise trajectory estimates. $T_{in}$ hereby denotes the starting time at which the ball is within the minimum required distance ($\delta$) before the ball hits the wall, and $T_{out}$ denotes the last point in time at which the ball is still within the minimum required distance ($\delta$) after the ball has hit the wall before the ball is further away from the wall than the minimum required distance ($\delta$).

In this example, the time resolution of the camera or cameras is varied (from $\Delta t_1$ to $\Delta t_2$) in view of the coefficient of restitution of the ball being lower than 1. As outlined above, this may provide for an optimised tracking of the trajectory of the ball as the velocity of the ball changes after the ball has hit the wall.

Figure 9:
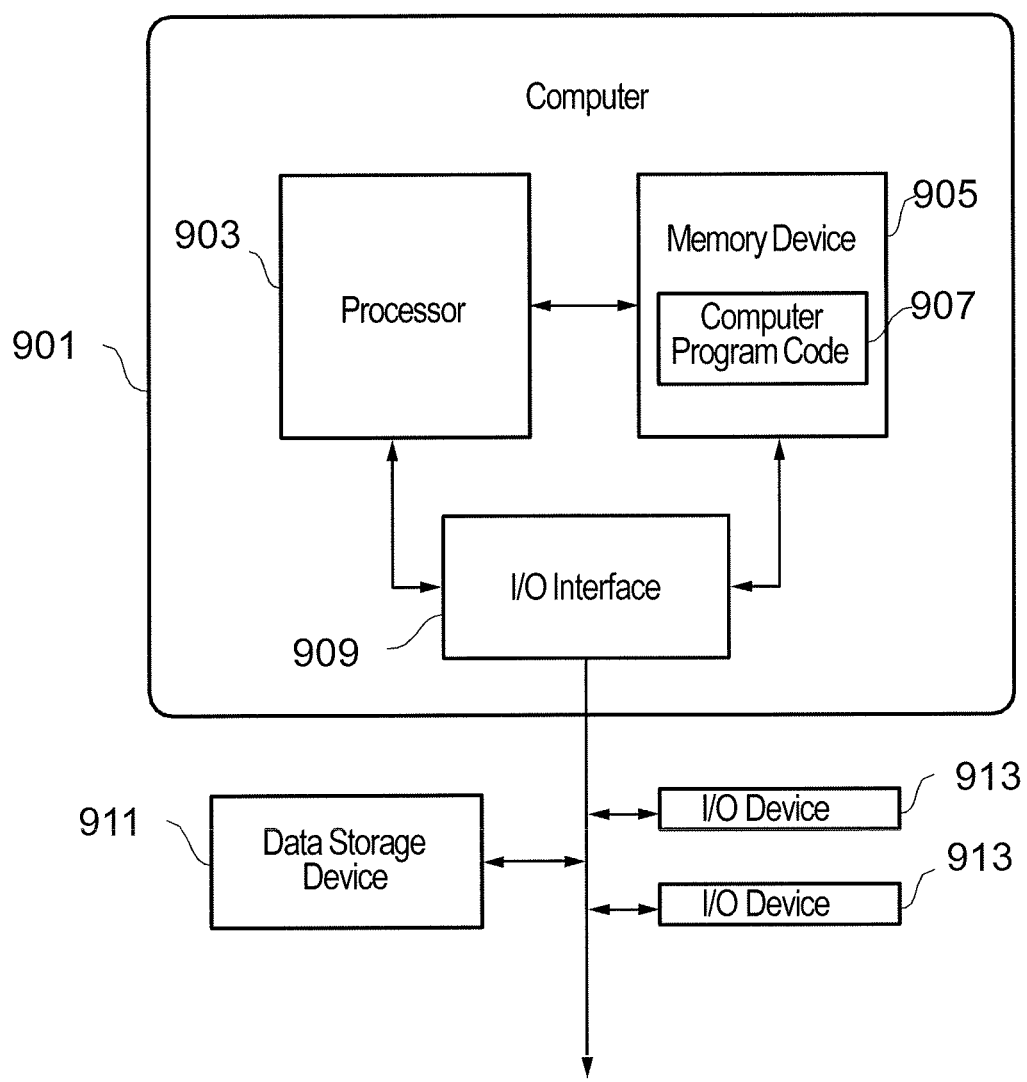
FIG. 9 shows a structure of a computer system and computer program code that may be used to implement the disclosed methods.

FIG. 9 shows a structure of a computer system and computer program code that may be used to implement any of the disclosed methods.

In FIG. 9, computer system 901 comprises a processor 903, including one or more computer processing units (CPUs) coupled through one or more I/O Interfaces 909 to one or more hardware data storage devices 911 and one or more I/O devices 913 and 915. Processor 903 may also be connected to one or more memory devices or memories 905. At least one memory device 905 contains stored computer program code 907, which is a computer program that comprises computer-executable instructions. The stored computer program code includes a program that implements the method and method aspects presented herein. The data storage devices 911 may store the computer program code 907. Computer program code 907 stored in the storage devices 911 is configured to be executed by processor 903 via the memory devices 905. Processor 903 executes the stored computer program code 907.

Memory 905 may comprise any known computer-readable storage medium, which is described below. In one implementation, cache memory elements of memory 905 provide temporary storage of at least some program code (e.g., program code 907) in order to reduce the number of times code needs to be retrieved from bulk storage while instructions of the program code are carried out. Moreover, similar to CPU 903, memory 905 may reside at a single physical location, comprising one or more types of data storage, or be distributed across a plurality of physical systems in various forms.

I/O interface 909 comprises any system for exchanging information to or from an external source. I/O devices 913, 915 comprise any known type of external device, including a display device (e.g., monitor), keyboard, etc. A bus provides a communication link between each of the components in computer system 901, and may comprise any type of transmission link, including electrical, optical, wireless, etc.

I/O interface 909 also allows computer system 901 to store information (e.g., data or program instructions such as program code 907) on and retrieve the information from computer data storage unit 911 or another computer data storage unit (not shown). Computer data storage unit 911 may comprise any known computer-readable storage medium. For example, computer data storage unit 911 may be a non-volatile data storage device, such as a semiconductor memory, a magnetic disk drive (i.e., hard disk drive) or an optical disc drive (e.g., a CD-ROM drive which receives a CD-ROM disk).

An implementation of the present disclosure may take the form of a computer program product embodied in one or more computer-readable storage medium(s) (e.g., memory 905 and/or computer data storage unit 911) having computer-readable program code (e.g., program code 907) embodied or stored thereon.

Program code (e.g., program code 907) embodied on a computer-readable medium may be transmitted using any appropriate medium, including but not limited to wireless, wireline, optical fiber cable, radio frequency (RF), etc., or any suitable combination of the foregoing.

Figure 10:
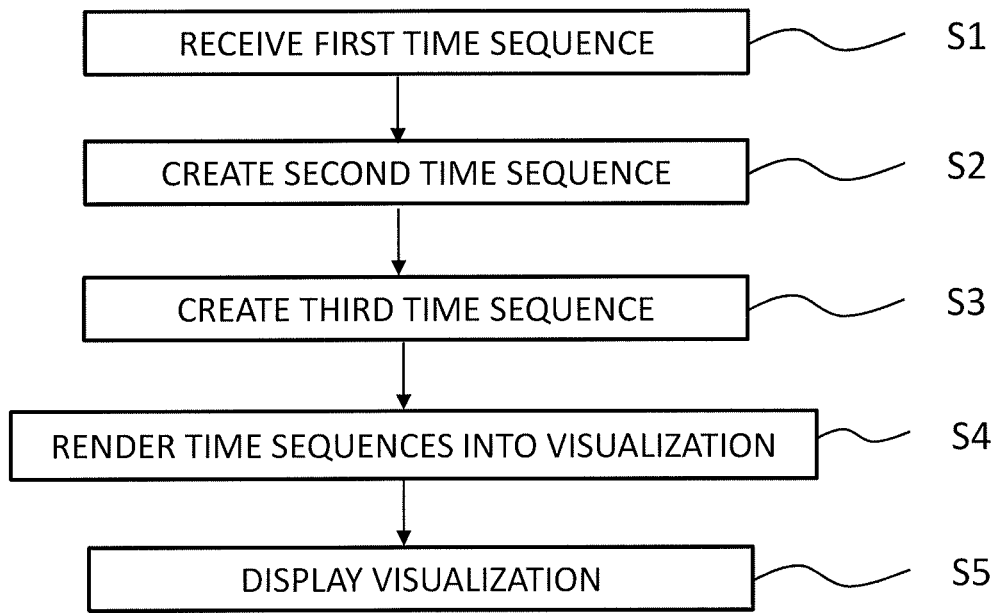
FIG. 10 is a flow diagram of an embodiment of a computer-automated method of an embodiment of the disclosure for analysing network performance data.

FIG. 10 is a flow diagram of an embodiment of the above-described computer-automated method for analysing network performance data.

In Step S1, there is received a data set containing a log of a first time sequence of events in which each event is associated with at least one network location and has been classified into one of a plurality of event types.

In Step S2, there is created a second time sequence from the first time sequence by aggregating the events into event patterns, wherein each event pattern is defined as a plurality of events which are in a specific sequence of event types, each event pattern being classified into one of a plurality of event pattern types.

In Step S3, there is created a third time sequence from the second time sequence by aggregating the event patterns into gaming strategies, wherein each strategy is defined as a plurality of patterns which are in a specific sequence of pattern types, each gaming strategy being classified into one of a plurality of strategy types.

In Step S4, there is rendered into a visualization some desired combination of the first time sequence, the second time sequence and the third time sequence such that in the visualization each of said types is visually distinct from other types in the same time sequence. If all combinations are rendered, then a desired combination can be picked out by a user when the visualization is displayed.

In Step S5, the visualization is displayed on a display.

Figure 11:
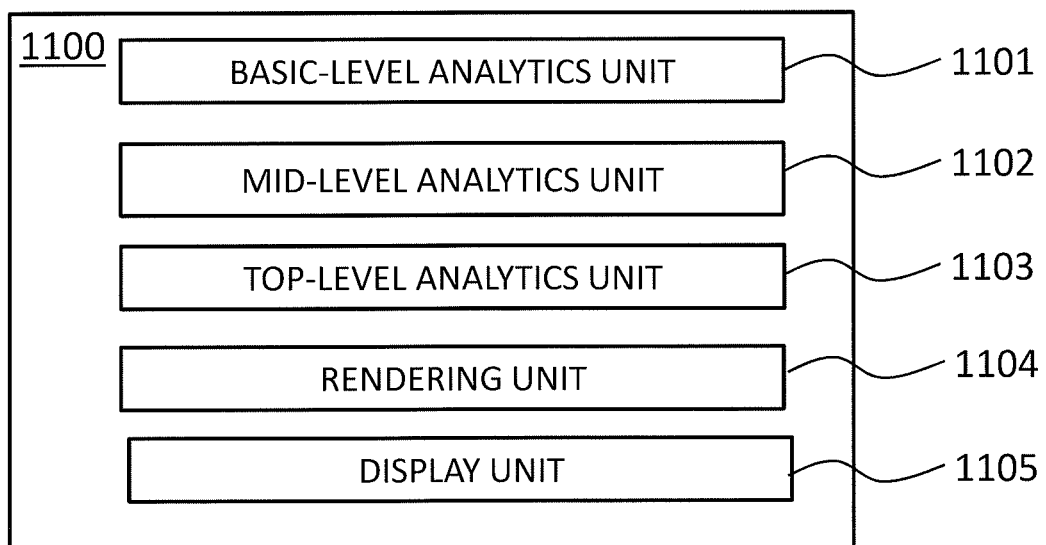
FIG. 11 is a block schematic diagram showing a computer system of an embodiment of the disclosure configured to analyse network performance data.

FIG. 11 is a block schematic diagram showing a computer system 1100 of an embodiment of the disclosure configured to analyse network performance data.

A basic-level analytics unit 1101 is configured to pre-process raw event data to generate a data set containing a log of a first time sequence of events which have been classified into one of a plurality of event types.

A mid-level analytics unit 1102 is configured to create a second time sequence from the first time sequence by aggregating the events into event patterns, wherein each event pattern is defined as a plurality of events which are in a specific sequence of event types, each event pattern being classified into one of a plurality of event pattern types.

A top-level analytics unit 1103 is configured to create a third time sequence from the second time sequence by aggregating the event patterns into event strategies, wherein each event strategy is defined as a plurality of event patterns which are in a specific sequence of event pattern types, each event strategy being classified into one of a plurality of event strategy types.

A rendering unit 1104 is operable to render into a visualization a desired combination of the first time sequences, the second time sequence and the third time sequence such that in the visualization each of said types is visually distinct from other types in the same time sequence. If all combinations are rendered, then a desired combination can be picked out by a user when the visualization is displayed.

A display unit 1105 is configured to receive the rendered visualization and display it for a user.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A computer-automated method for analyzing sports performance data from a game, the method comprising:
receiving, by a computing device, a data set containing a log of a first time sequence of game data events in which each event has been classified into one of a plurality of event types;
creating, by the computing device, a second time sequence from the first time sequence by aggregating the events into event patterns, wherein each event pattern is defined as a plurality of events which are in a specific sequence of event types, each event pattern being classified into one of a plurality of event pattern types;
creating, by the computing device, a third time sequence from the second time sequence by aggregating the event patterns into event strategies, wherein each event strategy is defined as a plurality of event patterns which are in a specific sequence of event pattern types, each event strategy being classified into one of a plurality of event strategy types; and
rendering, by the computing device, into a visualization at least one of the time sequences such that in the visualization each of the types is visually distinct from other types in the same time sequence.

2. The method of claim 1, wherein the event pattern types are predefined.

3. The method of claim 2:
wherein the event pattern types are predefined by rules of a game; and
wherein the events are events in a game that has been, or is being, played according to the rules.

4. The method of claim 3, wherein the event strategy types are predefined so that each specific sequence of event pattern types defined as an event strategy represents implementation of a gaming strategy.

5. The method of claim 1, wherein the event pattern types are defined as part of creating the second time sequence from the first time sequence and according to the first time sequence.

6. The method of claim 1, wherein the event strategy types are predefined.

7. The method of claim 1, wherein the event strategy types are defined as part of creating the third time sequence from the second time sequence and according to the second time sequence.

8. The method of claim 1, wherein the game is a sport and the events are measured during playing the sport.

9. The method of claim 8, wherein the sport is a racquet sport, a hand sport, a bat-and-ball sport, a football sport, and/or a cue sport.

10. The method of claim 8, wherein the events are ball contacts with a playing surface and/or a playing implement or part thereof.

11. The method of claim 1, further comprising co-rendering a representation of the events into the visualization.

12. The method of claim 11, wherein the representation is video footage of the events recorded in parallel with logging the first time sequence of events.

13. The method of claim 11, wherein the representation is video footage rendered at least in part from an automated analysis of the first and second time sequences.

14. The method of claim 1, wherein the rendering produces a visualization in which the first, second, and third time sequences are presented with a common time base.

15. The method of claim 1, further comprising:
recognizing a time evolution of events in the data set by matching the current event patterns and/or strategies to a first time period of at least one stored data set in which the same event patterns and/or strategies are present; and
predicting future events and/or patterns based on warping the first time period of the at least one stored data set onto the current data set and using the warped second time period of the at least one stored data set as the prediction.

16. The method of claim 1, further comprising creating at least one higher order time sequence from the time sequence of the previous highest order by aggregating the groups of the previous highest order, referred to as sub-ordinate groups, into supra-ordinate groups, wherein each supra-ordinate group is defined as a plurality of sub-ordinate groups which are in a specific sequence of sub-ordinate group types, each supra-ordinate group being classified into one of a plurality of event supra-ordinate group types.

17. A non-transitory computer readable recording medium storing a computer program product for controlling a computing device for automated analyzing sports performance data from a game, the computer program product comprising software instructions which, when run on processing circuitry of the computing device, causes the computing device to:
- receive, by the computing device, a data set containing a log of a first time sequence of game data events in which each event has been classified into one of a plurality of event types;
- create, by the computing device, a second time sequence from the first time sequence by aggregating the events into event patterns, wherein each event pattern is defined as a plurality of events which are in a specific sequence of event types, each event pattern being classified into one of a plurality of event pattern types;
- create, by the computing device, a third time sequence from the second time sequence by aggregating the event patterns into event strategies, wherein each event strategy is defined as a plurality of event patterns which are in a specific sequence of event pattern types, each event strategy being classified into one of a plurality of event strategy types; and
- render, by the computing device, into a visualization at least one of the time sequences such that in the visualization each of the types is visually distinct from other types in the same time sequence.

18. A computer system for analyzing sports performance data from a game, the system comprising:
- a data input operable to receive a data set containing a log of a first time sequence of game data events in which each event has been classified into one of a plurality of event types;
- memory operable to store the data set;
- processing circuitry operable to analyze the data set by:
  - creating a second time sequence from the first time sequence by aggregating the events into event patterns, wherein each event pattern is defined as a plurality of events which are in a specific sequence of event types, each event pattern being classified into one of a plurality of event pattern types;
  - creating a third time sequence from the second time sequence by aggregating the event patterns into event strategies, wherein each event strategy is defined as a plurality of event patterns which are in a specific sequence of event pattern types, each event strategy being classified into one of a plurality of event strategy types; and
  - rendering into a visualization into a visualization at least one of the time sequences such that in the visualization each of the types is visually distinct from other types in the same time sequence; and
- an output operable to output the visualization to a display.

* * * * *